United States Patent [19]
Yanagisawa

[11] Patent Number: 5,146,802
[45] Date of Patent: Sep. 15, 1992

[54] DRIVE SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 639,072

[22] Filed: Jan. 9, 1991

[30] Foreign Application Priority Data

Apr. 14, 1990 [JP] Japan .................................. 2-99044

[51] Int. Cl.⁵ ........................ F16H 25/20; F16H 29/20
[52] U.S. Cl. .............................. 74/424.8 R; 74/89.15; 74/665 L
[58] Field of Search ............ 74/89.15, 424.8 R, 665 L

[56] References Cited

U.S. PATENT DOCUMENTS

| | | | |
|---|---|---|---|
| 2,847,859 | 8/1958 | Lynott | 74/37 |
| 2,857,032 | 10/1958 | Johnson et al. | 197/1 |
| 3,422,538 | 1/1969 | Panissidi | 33/26 |
| 3,640,147 | 2/1972 | Fantoni | 74/424.8 R |
| 4,171,657 | 10/1979 | Halberschmidt et al. | 83/886 |
| 4,346,728 | 8/1982 | Sulzer | 74/89.15 X |
| 4,438,986 | 3/1984 | Teramachi | 308/6 R |
| 4,542,661 | 9/1985 | Teramachi | 74/424.8 |
| 4,764,154 | 8/1988 | Teramachi | 464/168 |
| 4,916,963 | 4/1990 | Takei | 74/89.15 X |
| 4,939,946 | 7/1990 | Teramachi | 74/89.15 |
| 4,977,788 | 12/1990 | Besemann | 74/424.8 R |
| 4,995,277 | 2/1991 | Yanagisawa | 74/89.15 |

FOREIGN PATENT DOCUMENTS

| | | |
|---|---|---|
| 0265855 | 10/1987 | European Pat. Off. . |
| 3628202 | 2/1988 | Fed. Rep. of Germany . |
| 61-31757 | 2/1986 | Japan .................................. 74/89.15 |
| 62-165057 | 7/1987 | Japan . |
| 63-30646 | 2/1988 | Japan .................................. 74/89.15 |
| 63-191533 | 8/1988 | Japan . |
| 1-229160 | 9/1989 | Japan . |
| 1-303359 | 12/1989 | Japan . |
| 1-303360 | 12/1989 | Japan . |
| 2-134443 | 5/1990 | Japan . |
| 2-284094 | 11/1990 | Japan . |

Primary Examiner—Allan D. Herrmann
Assistant Examiner—Julie Krolikowski

[57] ABSTRACT

Both ends of a main shaft are fixed so as not to rotate, so a rotatable moving body can be moved along the main shaft when a screw-rotor is rotated on the main shaft and a spline-rotor does not rotate thereon. The rotatable moving body can be rotated on the main shaft when the screw-rotor and the spline-rotor rotate on the main shaft. Further, the rotatable moving body can be moved along and rotated on the main shaft when the spline-rotor rotates on the main shaft and the screw-rotor does not rotate thereon. In case that both ends of the main shaft are respectively fixed to travellers, which are capable of moving in the direction perpendicular to the axial direction of the main shaft in the same direction at the same speed, the rotatable moving body can be moved in a plane. Further, in case of a plurality of sub-drive systems, a plurality of rotatable moving bodies can be moved independently.

19 Claims, 12 Drawing Sheets

DRIVE SYSTEM

BACKGROUND OF THE INVENTION

The present invention relates to a drive system, and more specifically relates to a drive system which is capable of moving a rotatable moving body to discretionary positions and rotating the same.

Conventionally, many types of drive systems have existed. Some of them were disclosed in Japanese Patent Kokai No. 63-191533, U.S. Pat. No. 2,857,032, No. 3,422,538 and No. 4,171,657, German Patent No. DE-36 28 202A, and European Patent No. EP-265-855-A. All of them are capable of moving one moving body to discretionary positions in a plane. Tools for machining, instruments for inspection or measurement, work to be machined, robot-heads, etc. can be attached to the moving body and are moved to prescribed positions for machining, etc.

Those conventional drive systems, however, have the following disadvantages.

The conventional drive systems have enough function for moving their moving bodies in a plane but attitude of the moving body cannot be changed because rods, which are extended in X-Y directions, pierce through the moving body. Therefore, in case of, for example, machining at an inclining place, assembling parts at an inclining position, etc., an extra mechanism for inclining tools, robot-heads, etc. must be attached to the moving body. With this extra mechanism, structure of the machine including the drive system should be complex, and manufacturing cost of the machine should be increased.

SUMMARY OF THE INVENTION

An object of the present invention is to provide a drive system which is capable of changing attitude of a rotatable moving body with a simple structure.

Another object of the present invention is to provide a drive system having a plurality of rotatable moving bodies.

To achieve the objects, the present invention has the following structures.

First structure is a drive system comprising a main shaft having a spiral screw groove grooved on the outer circumferential face and a linear spline groove grooved thereon in the axial direction to cross the screw groove, both ends of the main shaft are fixed so as not to rotate, a rotatable moving body having a rotatable screw-rotor covering the main shaft and screwing the screw groove thereon and a rotatable spline-rotor covering the main shaft and engaging with the spline groove thereon, and driving means for selectively rotating the screw-rotor and the spline-rotor.

Second structure is a drive system comprising a couple of travellers being movable linearly, travelling means for moving the travellers in the same direction at the same speed, a main shaft having a spiral screw groove grooved on the outer circumferential face and a linear spline groove grooved thereon in the axial direction to cross the screw groove, both ends of the main shaft are respectively fixed to the travellers so as not to rotate, a rotatable moving body having a rotatable screw-rotor covering the main shaft and screwing the screw groove thereon and a rotatable spline-rotor covering the main shaft and engaging with the spline groove thereon, and driving means for selectively rotating the screw-rotor and the spline-rotor.

The third structure is the drive system comprising a plurality of subdrive systems, each of the subdrive systems including a couple of travellers being movable linearly, travelling means for moving the travellers in the same direction at the same speed, a main shaft having a spiral screw groove grooved on the outer circumferential face and a linear spline groove grooved thereon, both ends of the main shaft are respectively fixed to the travellers so as not to rotate, a rotatable moving body having a rotatable screw-rotor covering the main shaft and screwing the screw groove thereon and a rotatable spline-rotor covering the main shaft and engaging with the spline groove thereon, and driving means for selectively rotating the screw-rotor and the spline-rotor, wherein moving planes, each of which includes positions to which the rotatable moving body moves, of the subdrive systems are mutually arranged in parallel.

In the present invention, the rotatable moving body can be moved along the main shaft when the screw-rotor is rotated on the main shaft whose ends are fixed so as not to rotate and the spline-rotor is prevented from rotating thereon. The rotatable moving body can be rotated on the main shaft when both the screw-rotor and the spline-rotor are rotated on the main shaft. Further, the rotatable moving body can be simultaneously moved along the main shaft and rotated thereon when the spline-rotor rotated on the main shaft and the screw-rotor is prevented from rotation. Therefore, the movable rotating body can be selectively moved and/or rotated, so that tools for machining, work to be machined, etc., which are attached to the rotatable moving body, can change their attitude.

If both ends of the main shaft are respectively fixed to a couple of the travellers, which can be moved together in the same direction at the same speed, the rotatable moving body is capable of moving in a plane. Therefore, the rotatable moving body can be selectively moved in a plane and/or rotated on the main shaft.

Further, a plurality of rotatable moving bodies can be independently operated if a plurality of the drive systems are combined.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The preferred embodiments of the invention will now be described by way of examples and with reference to the accompanying drawings, in which.

DETAILED DESCRIPTION OF THE PREFERRED EMBODIMENTS

Preferred embodiments of the present invention will now be described in detail with reference to the accompaying drawings. The first embodiment First Embodiment will be explained with reference to FIG. 1.

Figure 1:
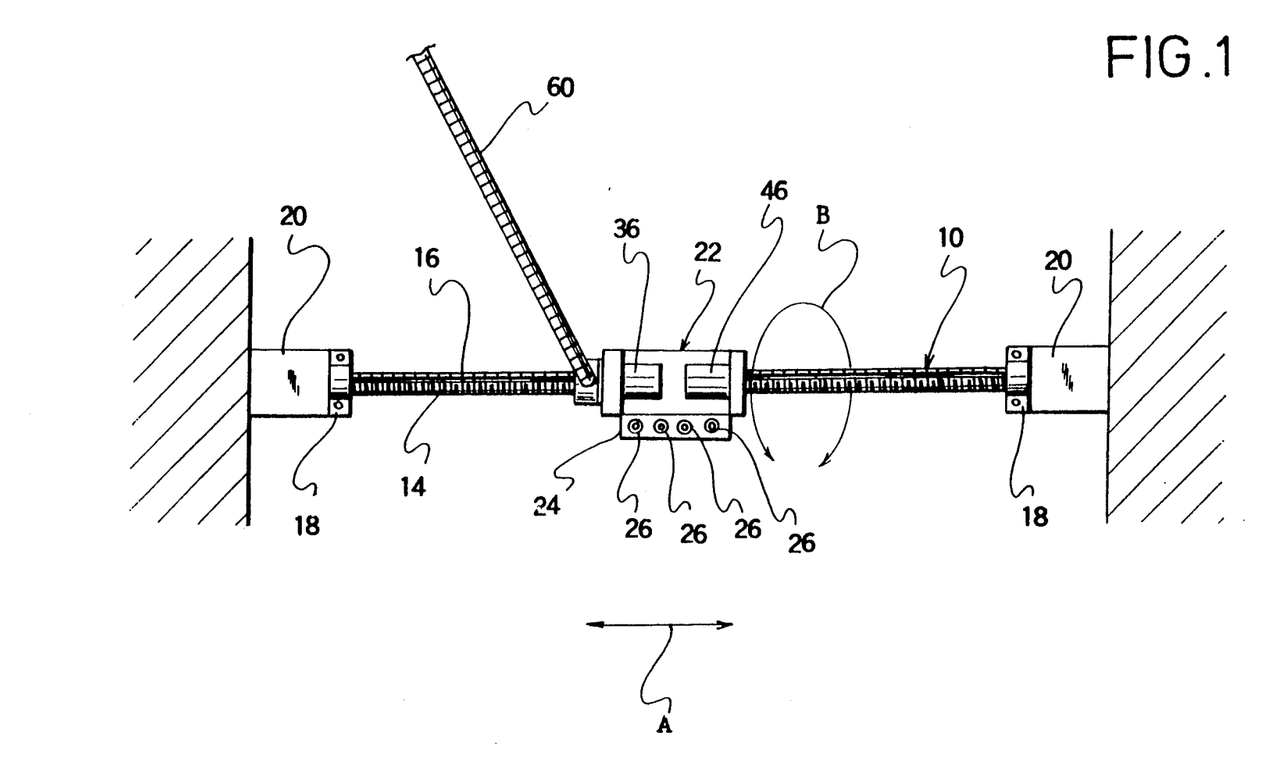
FIG. 1 shows a plan view of a drive system of a first embodiment.

FIG. 1 shows a plan view of a drive system of this embodiment.

Numeral 10 indicates a main shaft. On an outer circumferential face of the main shaft 10, there is grooved a spiral screw groove 14 and a plurality of linear spline grooves 16, which are grooved in the axial direction of the main shaft 10 and which cross the screw groove 14. Both ends of the main shaft 10 are respectively fixed at fixed sections 20 by fixing means 18 so as not to rotate. The fixing means 18 detachably fix the ends of the main shaft 10.

A rotatable slider 22 or a rotatable moving body covers the main shaft 10. There is provided an attaching section 24 for the rotatable slider 22. Robot-heads 26 are attached to the attaching section 24. Many kinds of tools, instruments for inspection or measuring, work to be machined or examined, etc. can be attached to the attaching section 24.

Next, the structure of the rotatable slider 22 will be explained with reference to FIGS. 2 and 3.

Figure 2:
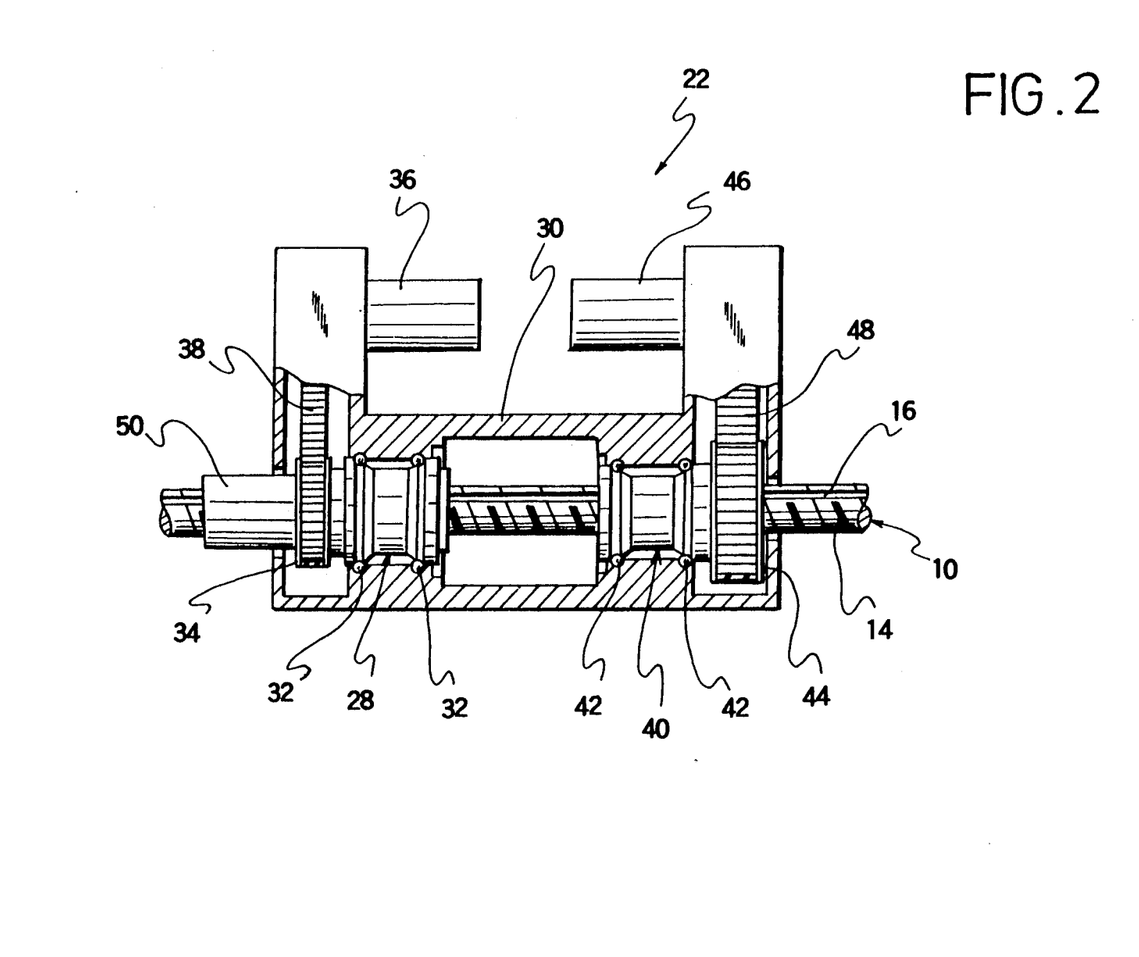
FIG. 2 shows a front sectional view illustrating an inner mechanism of a rotatable slider.

In FIG. 2, a screw-rotor 28 rotatably covers the main shaft 10 and screws the screw groove 14 together with mulitiple small metal balls (not shown). The metal balls 32 are provided between the outer circumferential face of the screw-rotor 28 and an inner face of a housing 30 of the rotatable slider 22, so that they form a ball bearing. There is fixed a timing pulley 34 on the outer end face of the screw-rotor 28. Rotational torque of a D.C. servo motor 36, which is fixed on the rotatable slider 22, can be transmitted to the timing pulley 34 and the screw-rotor 28 by a timing belt 38.

A spline-rotor 40 rotatably covers the main shaft 10 and engages with the spline grooves 16 together with multiple small metal balls (not shown). The metal balls 42 are provided between the outer circumferential face of the spline-rotor 40 and the inner face of the housing 30 of the rotatable slider 22, so that they form a ball bearing. There is fixed a timing pulley 44 on the outer end face of the spline-rotor 40. Rotational torque of a D.C. servo motor 46, which is also fixed on the rotatable slider 22, can be transmitted to the timing pulley 44 and the spline-rotor 40 by a timing belt 48.

Basic structure of the main shaft 10, the screw-rotor 28 and the spline-rotor 40 is the same as "a composite motion guide device" disclosed in the U.S. Pat. No. 4,939,946 (by Teramachi). However, the inventor has continued study, and he thought that if the main shaft 10 is fixed so as not to rotate, the rotatable slider 22 is capable of moving along the main shaft 10 and/or rotating thereon with the rotation of the screw-rotor 28 and/or the spline-rotor 40. Namely, when the screw-rotor 28 rotates and the spline-rotor 40 does not rotate, the rotatable slider 22 linearly moves in the direction "A" (see FIG. 1) along the main shaft 10. When both the screw-rotor 28 and the spline-rotor 40 rotate, the rotatable slider 22 rotates on the main shaft 10 as shown by an arrow "B" (see FIG. 1). Further, when the spline-rotor 40 rotates and the screw-rotor 28 does not rotate, the rotatable slider 22 moves in the direction "A" and simultaneously rotates in the direction "B".

Note that, motors 36 and 46 for rotating the screw-rotor 28 and the spline-rotor 40, timing belts 38 and 48 for transmitting the rotational torque of the motors 36 and 46, and timing pulleys 34 and 44, etc. consist of driving means. In case that the rotational angle of the rotatable slider 22 with respect to the main shaft 10 is small, the spline-rotor 40 may be rotated by an air cylinder unit, etc.

Figure 3:
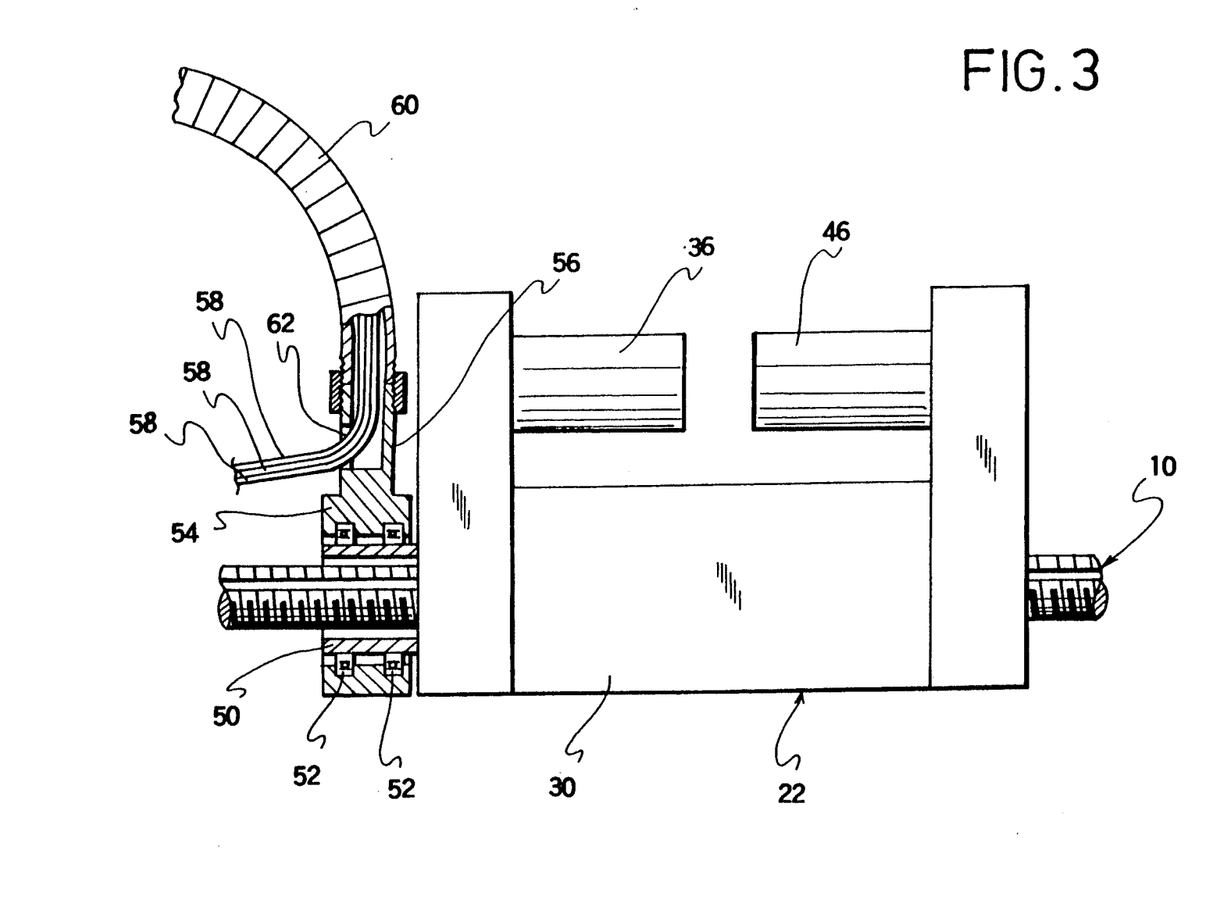
FIG. 3 shows a front view, with portions cut away for illustrating the relationship between the rotatable slider and a flexible guide tube, of the rotatable slider.

Next, means for supplying electric power to the motor 36 and 46 and another means for supplying compressed air, which drives the robot-heads 26 attached to the attaching seciton 24, to the robot-heads 26 with further reference to FIG. 3.

A cylindrical section 50 extends outwardly from the outer end face of the timing pulley 34, which is on the screw-rotor 28 side. The cylindrical section 50 is outwardly projected from the housing 30 of the rotatable slider 22. The projected portion of the cylindrical section 50 is covered with a free-ring 54. There is provided a ball bearing 52 between the free-ring 54 and the cylindrical section 50, so that the free-ring 54 can be freely rotated on the cylindrical section 50. There is radially projected a cylindrical part 56 from the free-ring 54. A flexible guide tube 60 through which electric cables 58 and air tubes 58 are introduced is connected to the cylindrical part 56. The cables 58 and tubes 58 are introduced out from an opening 62 of the cylindrical part 56 and connected to the motors 36 and 46 and the robot-heads 26. With the free-ring 54, no great force works to the guide tube 60 even if the rotatable slider 22 rotates on the main shaft 10. Note that, the free-ring 54 is held its position by a snap ring (not shown), etc. so as not to slip out from the cylindrical section 50.

Successively, the action of this embodiment will be explained.

When the screw-rotor 28 is rotated by the motor 36, the rotatable slider 22 moves on the main shaft 10 in the axial direction "A" thereof. Thus, the position of the rotatable slider 22 in the direction "A" can be defined at discretion. Further, if the spline-rotor 40 is rotated by the motor 46, the rotatable slider 22 rotates on the main shaft 10, so that the angle of the robot-heads 26 with respect to the main shaft 10 can be changed at discretion. Note that, this action of the drive system is controlled by a control unit (not shown) which has a built-in microcomputer. Electric supply to the motors 36 and 46 and air supply to the robot-heads 26 are controlled by the control unit, which has an assigned program.

(Second Embodiment)

Figure 4:
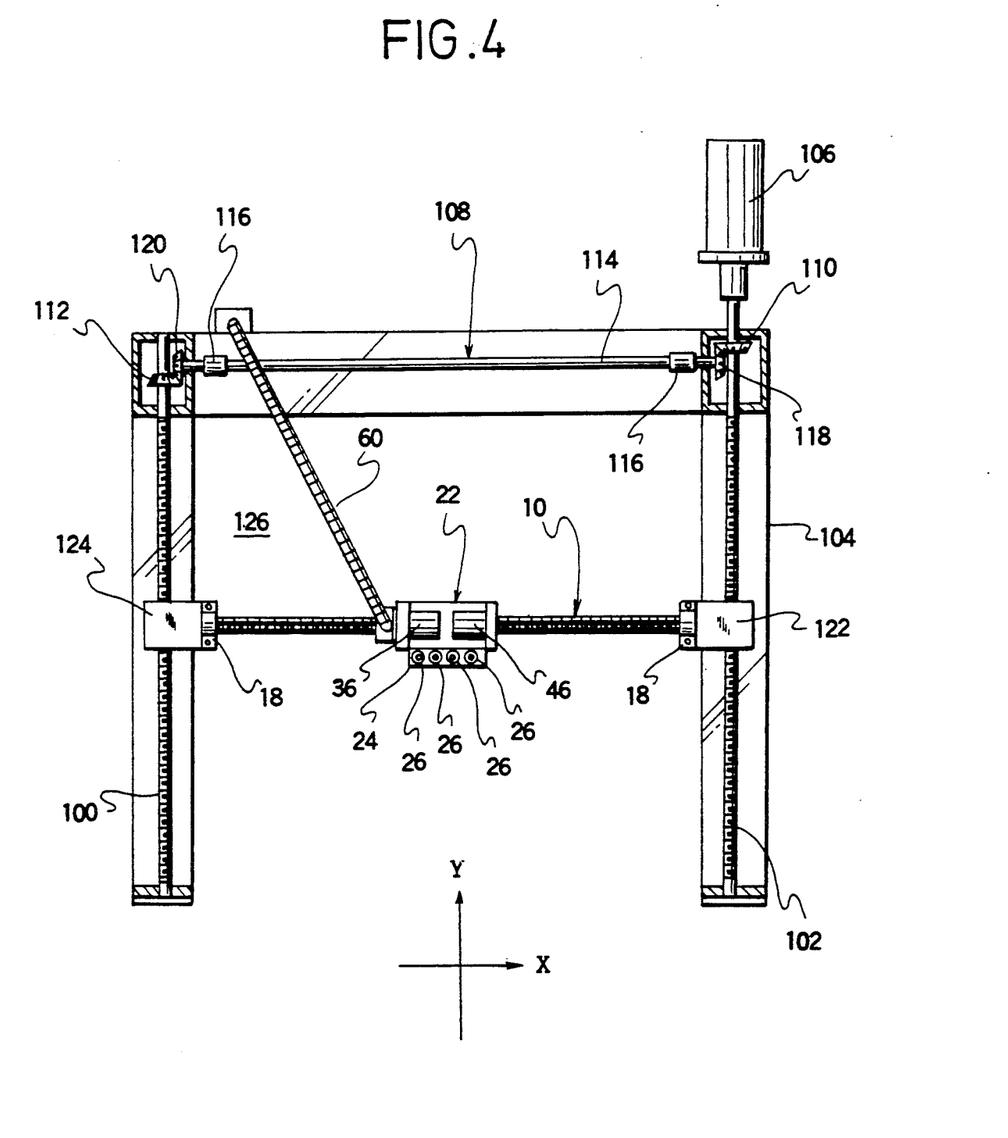
FIG. 4 shows a plan view of a drive system of a second embodiment.

The second embodiment will be explained with reference to FIG. 4. Note that, some elements which are the same as in the first embodiment are assigned the same numerals and the explanation thereof is omitted in the following embodiments.

A couple of ball bearing screws 100 and 102 are arranged in parallel and in a plane. The ball bearing screws 100 and 102 are set on a base 104 in the Y-direction. The one end of the ball bearing screw 102 is connected to a D.C. servo motor 106; the other end is rotatably supported by a part of the base 104. The motor 106 is fixed to the base 104 by fixing means (not shown). While, both ends of the ball bearing screw 100 are rotatably supported by parts of the base 104, and the rotational torque of the motor 106 is transmitted to the ball bearing screw 100 by a transmitting mechanism 108. With this transmitting mechanism 108, the ball bearing screws 100 and 102 can be synchronously rotated in the same direction at the same speed.

Next, the transmitting mechanism 108, which connects the ball bearing screws 100 and 102, will be explained.

Bevel gears 110 and 112 are respectively fixed at one end of the ball bearing screws 100 and 102. The bevel gears 110 and 112 are designed with their gear ratio 1:1.

Numeral 114 is a metal connecting shaft. There are respectively fixed bevel gears 118 and 120 at both ends of the connecting shaft 114 by couplers 116.

The bevel gears 118 and 120 are respectively engaged with the bevel gears 110 and 112. The bevel gears 118 and 120 are also designed with their gear ratio 1:1, so that the rotation of the bevel gear 110 is equally transmitted to the bevel gear 112 via the bevel gear 118, the connecting shaft 114 and the bevel gear 120. Note that, the couplers 116 connect the connecting shaft 114 and the bevel gears 118 and 120, and are capable of adjusting the distance between the bevel gears 118 and 120.

Numerals 122 and 124 are travellers, and they are respectively screwed on the ball bearing screws 102 and 100. The travellers 122 and 124 move on the ball bearing screws 102 and 100 in the same direction at the same speed, when the ball bearing screws 102 and 100 are rotated in the same direction at the same speed by the motor 106. Therefore, the ball bearing screws 100 and 102, and a motor mechanism having the motor 106 and the transmitting mechanism consist of travelling means for moving the travellers 122 and 124. Note that, the ball bearing screws 100 and 102, etc. are normally covered with covering means (not shown).

The main shaft 10 is arranged in the X-direction. Both ends of the main shaft 10 are respectively fixed to the travellers 122 and 124 by fixing means 18 so as not to rotate.

In the drive system of the second embodiment, the travellers 122 and 124 move in the Y-direction by the motor 106. At that time both travellers 122 and 124 move in the same direction at the same speed. With this operation, the position of the rotatable slider 22 in the Y-direction can be defined at discretion. While, the position of rotatable slider 22 in the X-direction can be defined by driving the motor 36. When the motor 36 is driven, the screw-rotor 28 rotates on the main shaft 10 and the rotatable slider 22 moves thereon in the X-direction. Therefore, the plane position of the rotatable slider 22 can be defined by the X-Y movement. And the rotatable slider 22 can be rotated on the main shaft 10 by rotating the spline-rotor 40, which is rotated by the motor 46, so that the angle of the robot-heads 26 can be changed at discretion. Note that; the action of the drive system is similar to the first embodiment, and is controlled by the control unit (not shown).

In this second embodiment, the travelling means for moving the travellers 122 and 124 has the ball bearing screws 100 and 102 and the motor 106 but it may be consisted of, for example, a motor and a belt drive mechanism.

THIRD EMBODIMENT

The third embodiment will be explained with reference to FIGS. 5 and 6.

In this embodiment, a couple of subdrive systems 200 and 202, each of which is the drive system of the second embodiment, are symmetrically set on a base 204.

The subdrive system 200 has ball bearing screws 206 and 208 arranged in the X-direction. The ball bearing screws 206 and 208 are rotated in the same direction at the same speed by a motor 212 and a transmitting mechanism 210. A travelling means including the ball bearing screws 206 and 208, the motor 212 and the transmitting mechanism 210 moves travellers 214 and 216, which are respectively screwed on the ball bearing screws 206 and 208, in the same direction at the same speed. The travellers 214 and 216 move in the X-direction.

Both ends of the main shaft 10a are respectively fixed to the travellers 214 and 216 so as not to rotate. The rotatable slider 22a is capable of moving in the Y-direction along the main shaft 10a and rotating on the main shaft 10a by the motors 36a and 46a.

Another subdrive system 202 has ball bearing screws 218 and 220 arranged in the X-direction. The ball bearing screws 218 and 220 are rotated in the same direction at the same speed by a motor 224 and a transmitting mechanism 222. A travelling means including the ball bearing screws 218 and 220, the motor 224 and the transmitting mechanism 222 moves travellers 226 and 228, which are respectively screwed on the ball bearing screws 218 and 220, in the same direction at the same speed. The travellers 226 and 228 move in the X-direction.

Both ends of the main shaft 10b are respectively fixed to the travellers 226 and 228 so as not to rotate. The rotatable slider 22b is capable of moving in the Y-direction along the main shaft 10b and rotating on the main shaft 10b by the motors 36b and 46b.

In this third embodiment, the rotatable sliders 10a and 10b can be independently moved, so that high efficient machining, etc. can be executed. Assembling work in the air also can be executed with robot-arms. Further, if the robot-heads 26a and 26b horizontally change their attitude, the robot-heads 26a and 26b can be moved by numerical control system.

FOURTH EMBODIMENT

Figure 7:
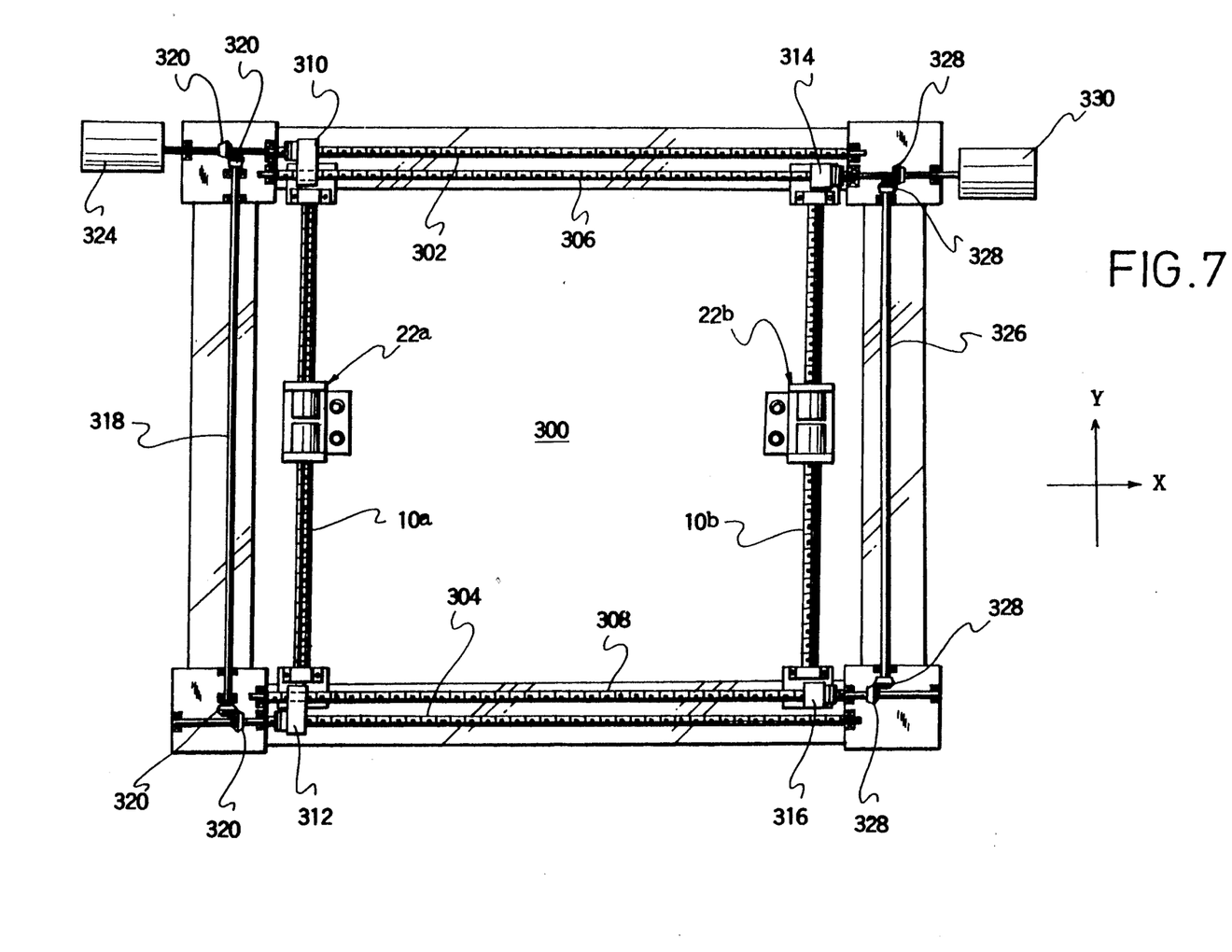
FIG. 7 shows a plan view of a drive system of fourth embodiment.

The fourth embodiment will be explained with reference to FIG. 7.

Figure 5:
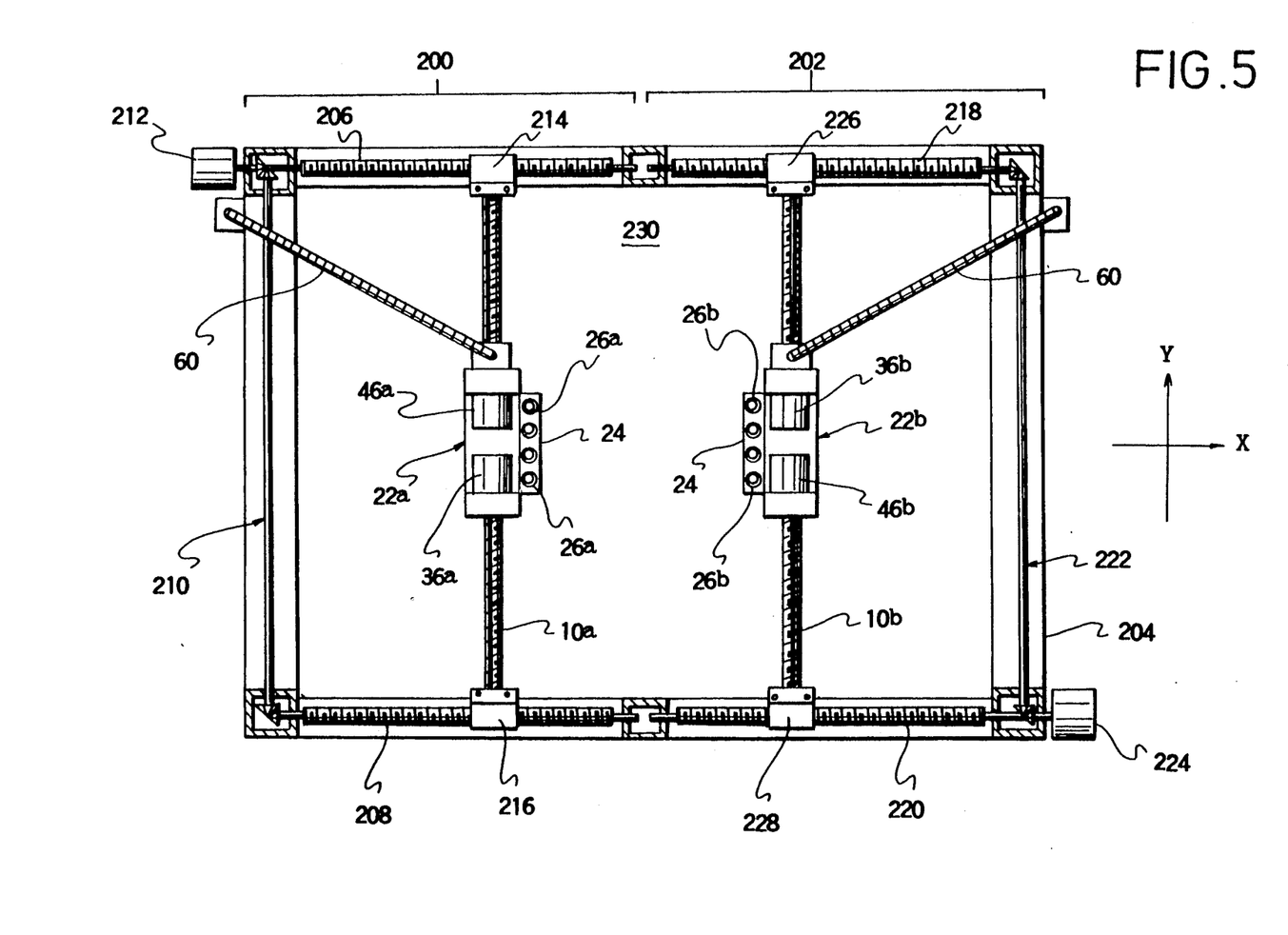
FIG. 5 shows a plan view of a drive system of third embodiment.
Figure 6:
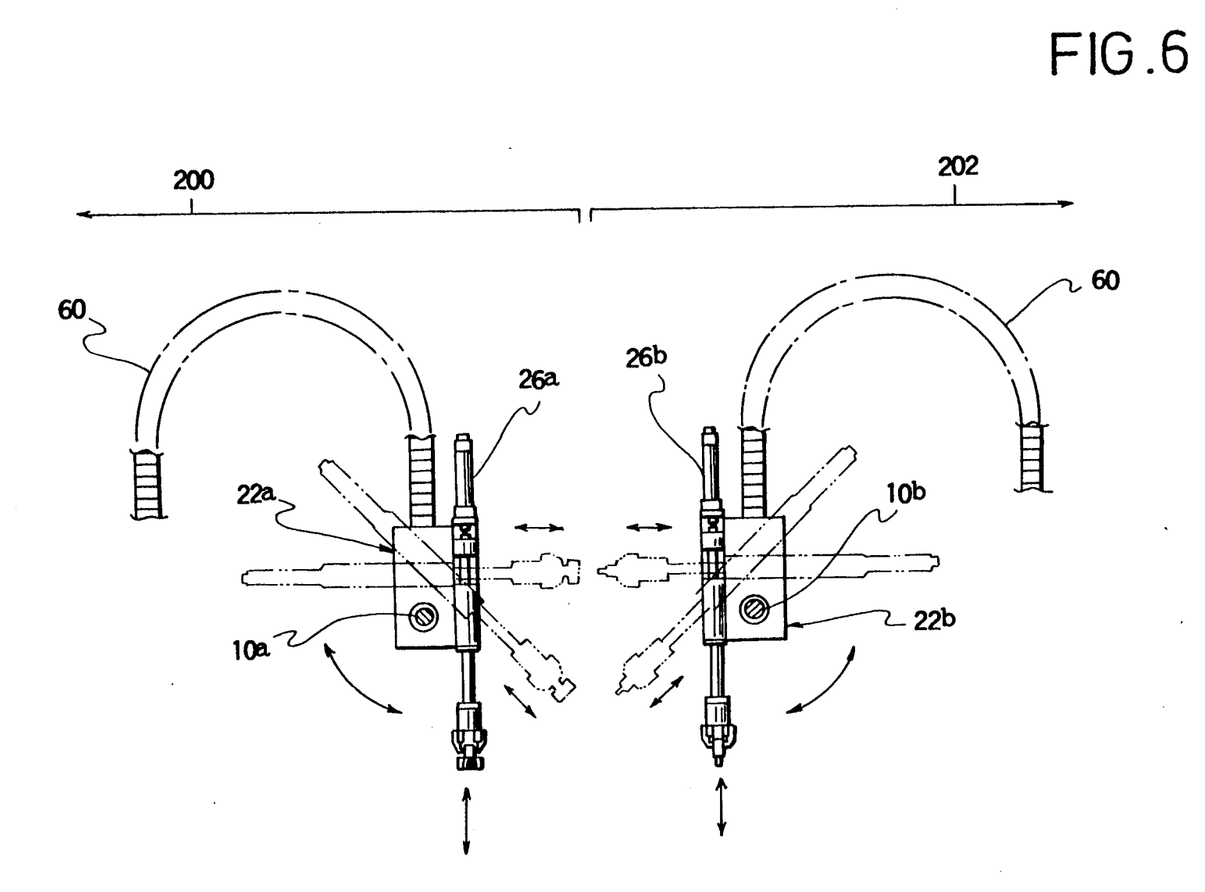
FIG. 6 shows a front view of a rotatable slider of third embodiment.

In the third embodiment, the stroke in the X-direction of the rotatable sliders 22a and 22b is respectively limited to a half of the length of the plane 230 in the X-direction so as not to obstruct each other (see FIG. 5).

In this embodiment, the stroke in the X-direction of the rotatable sliders 22a and 22b is designed to be almost equal to the length of a plane 300 in the X-direction.

Ball bearing screws 302, 304, 306 and 308, whose length are almost the same, are arranged in the X-direction. Both ends of the main shaft 10a, to which the rotatable slider 22a is provided, are respectively fixed to travellers 310 and 312, which are respectively screwed on the ball bearing screws 302 and 304; both ends of the main shaft 10b, to which the rotatable slider 22b is provided, are respectively fixed to travellers 314 and 316, which are respectively screwed on the ball bearing screws 306 and 308.

The ball bearing screws 306 and 308 are respectively passed through the travellers 310 and 312 without contact, so that the travellers 310 and 312 are not concerned with the ball bearing screws 306 and 308 for moving the travellers 310 and 312 in the X-direction. Therefore, the rotatable sliders 22a and 22b are capable of moving over all the area of the plane 300.

Rotational torque of a motor 324 is transmitted to the ball bearing screws 302 and 304 by a connecting shaft 318 and bevel gears 320; rotational torque of a motor 330 is transmitted to the ball bearing screws 306 and 308 by a connecting shaft 326 and bevel gears 328.

FIFTH EMBODIMENT

Figure 8:
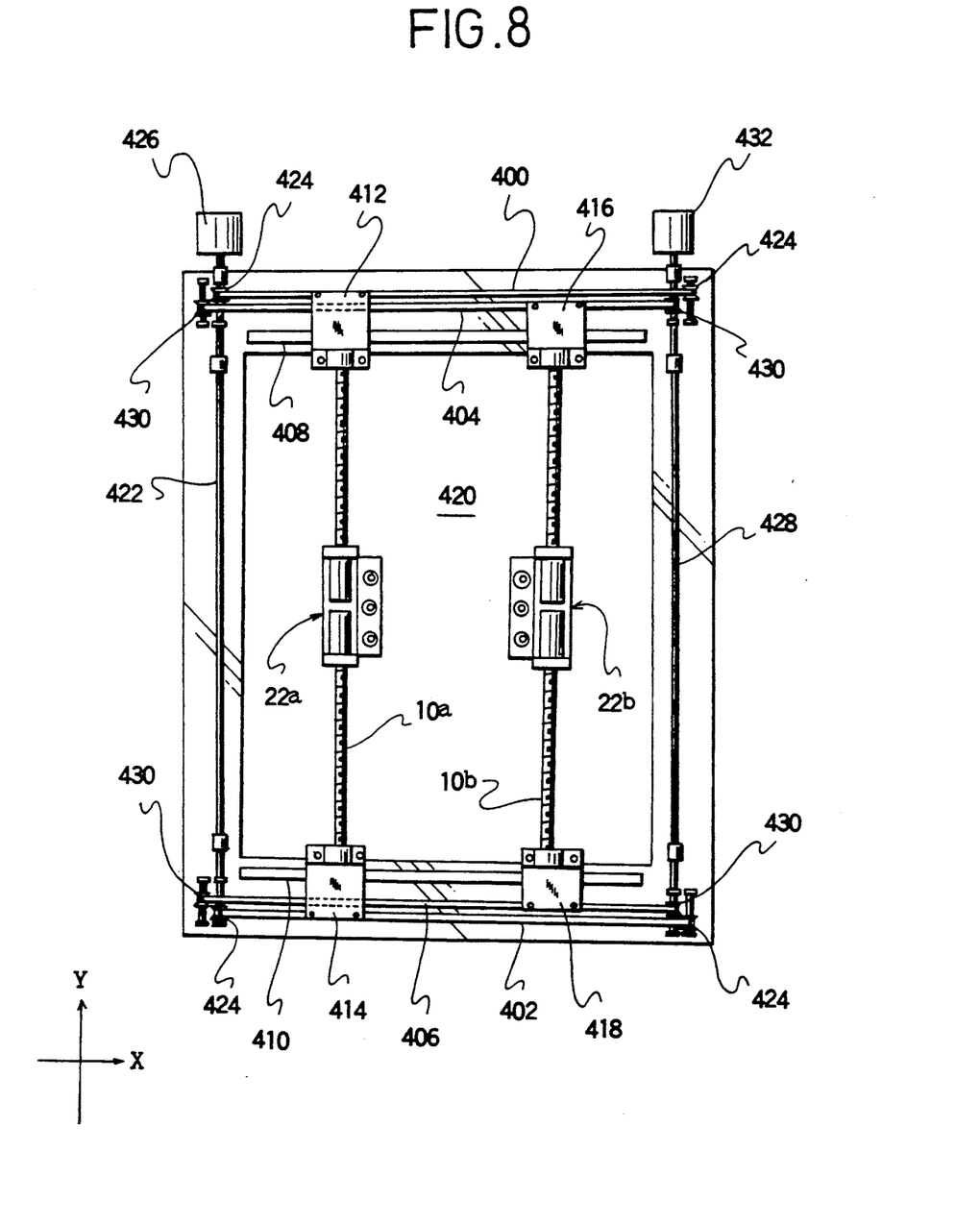
FIG. 8 shows a plan view of a drive system of a fifth embodiment.

The fifth embodiment will be explained with reference to FIG. 8.

This embodiment is a modification of the fourth embodiment. Endless belts 400, 402, 404 and 406 are used instead of the ball bearing screws.

The endless belts 400, 402, 404 and 406 are arranged in the X-direction.

Both ends of the main shaft 10a, to which the rotatable slider 22a is provided, are respectively fixed to travellers 412 and 414, which are respectively connected to the endless belts 400 and 402 and which are capable of linearly moving in the X-direction along linear guides 408 and 410.

Both ends of the main shaft 10b, to which the rotatable slider 22b is provided, are respectively fixed to travellers 416 and 418, which are respectively connected to the endless belts 404 and 406 and which are capable of linearly moving in the X-direction along the linear guides 408 and 410.

The endless belts 404 and 406 respectively pass through the travellers 412 and 414 without contact, so that the travellers 412 and 414 are not concerned with the endless belts 404 and 406 for moving in the X-direction. Therefore, the rotatable sliders 22a and 22b are capable of moving over all the area of a plane 420.

Rotational torque of a motor 426 is transmitted to the endless belts 400 and 402 by a connecting shaft 422 and pulleys 424; rotational torque of a motor 432 is transmitted to the endless belts 404 and 406 by a connecting shaft 428 and pulleys 430.

SIXTH EMBODIMENT

Figure 9:
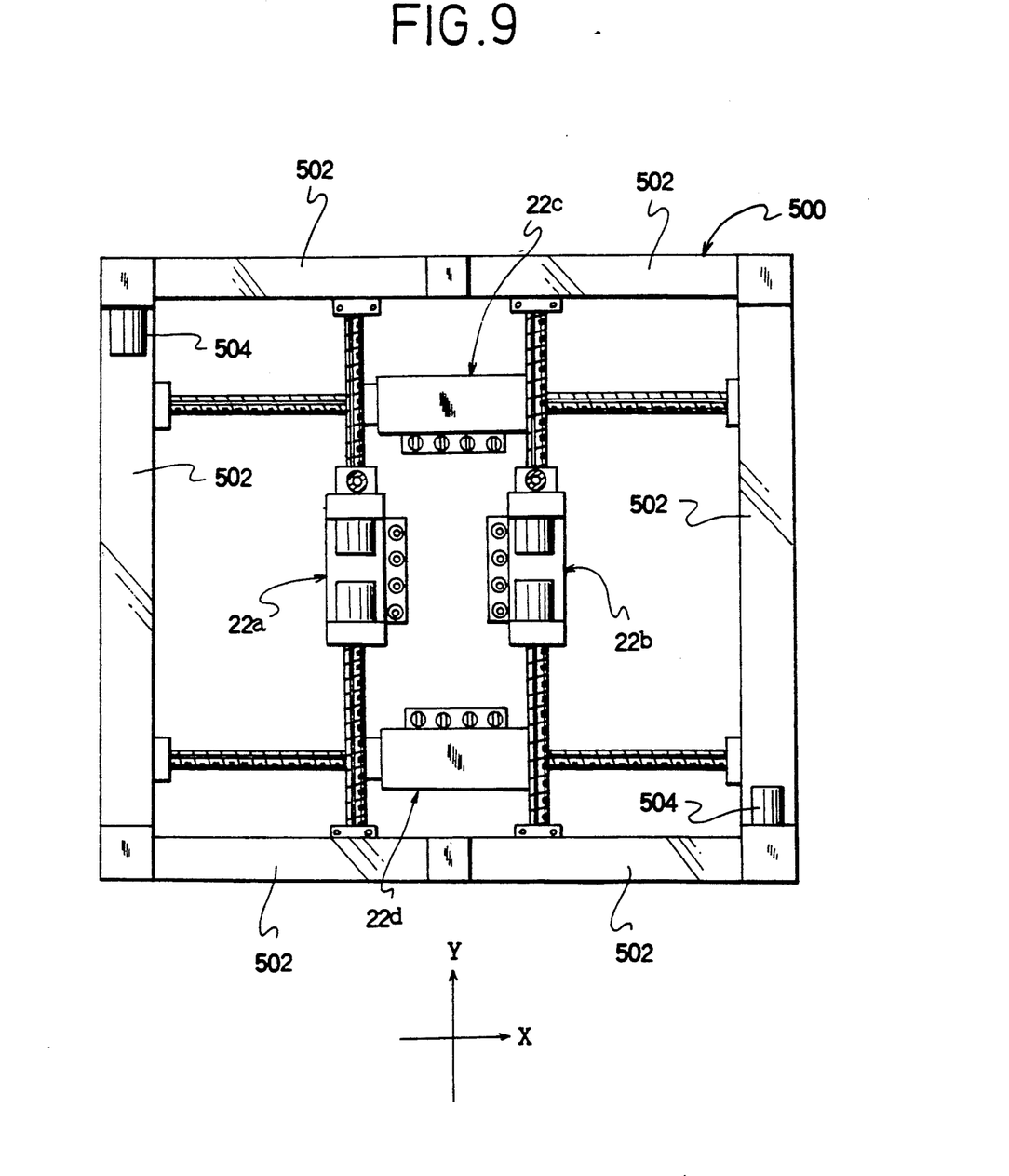
FIG. 9 shows a plan view of a drive system of a sixth embodiment.

The sixth embodiment will be explained with reference to FIG. 9.

In this embodiment, a couple of subdrive systems, each of which is the drive system of the third embodiment, are set on an upper side and lower side of a base 500. Note that, ball bearing screws (or endless belts) are covered with covers 502.

Four rotatable sliders 22a, 22b, 22c and 22d can be moved independently. One subdrive system, which is set on the lower side of the base 500, is rotated 90 degrees with respect to the other subdrive system, which is set on the upper side thereof. The subdrive systems are mutually separated away in the vertical direction so as not to obstruct each other. Motors 504 for driving ball bearing screws (or endless belts), not shown, are provided on the upper side or lower side of the covers 502 with a belt-transmitting mechanism etc. (not shown).

SEVENTH EMBODIMENT

The seventh embodiment will be explained with reference to FIG. 10.

This embodiment is a modified embodiment of the fourth embodiment.

A plane, in which the rotatable sliders 22a and 22b move, is separated away in the vertical direction from a plane, in which the rotatable sliders 22c and 22d move.

The rotatable sliders 22a and 22b and ball bearing screws 600, 602, 604 and 606, etc. for driving the rotatable sliders 22a and 22b are provided in the plane higher than the rotatable sliders 22c and 22d and ball bearing screws 608, 610, 612 and 614, etc. for driving the rotatable sliders 22c and 22d with respect to a base 616. Therefore, mutual interference between the rotatable sliders 22a and 22b and the rotatable sliders 22c and 22d is prevented.

EIGHTH EMBODIMENT

Figure 11:
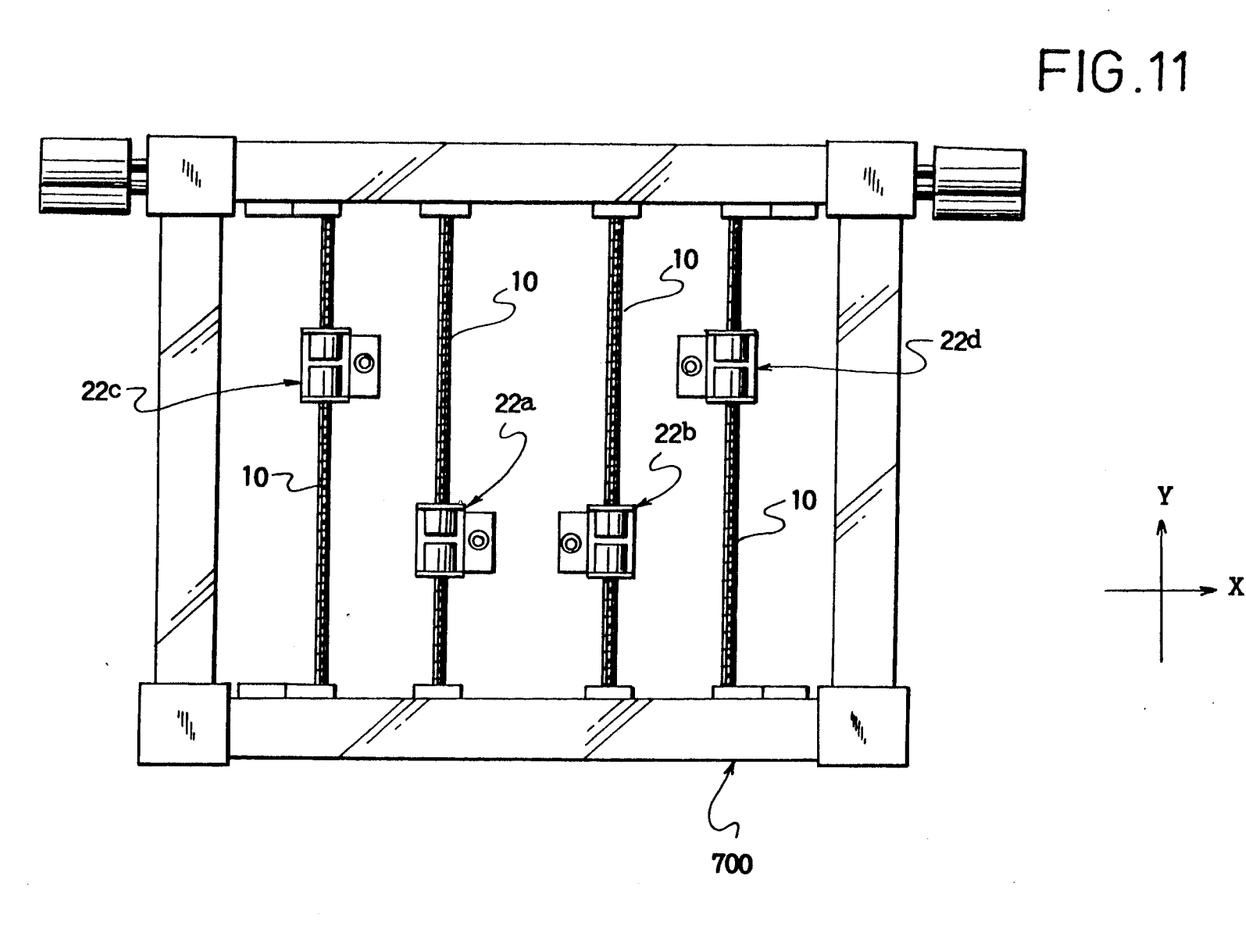
FIG. 11 shows a plan view of a drive system of a eighth embodiment.

The eighth embodiment will be explained with reference to FIG. 11.

This embodiment is a modified embodiment of the fourth or fifth embodiment.

A plane, in which the rotatable sliders 22a and 22b move, is separated away in the vertical direction from a plane, in which the rotatable sliders 22c and 22d move.

The rotatable sliders 22a and 22b and means for driving the rotatable sliders 22a and 22b are provided in the plane higher than the rotatable sliders 22c and 22d and means for driving the rotatable sliders 22c and 22d with respect to a base 700. Therefore, mutual interference between the rotatable sliders 22a and 22b and the rotatable sliders 22c 22d is prevented.

Figure 10:
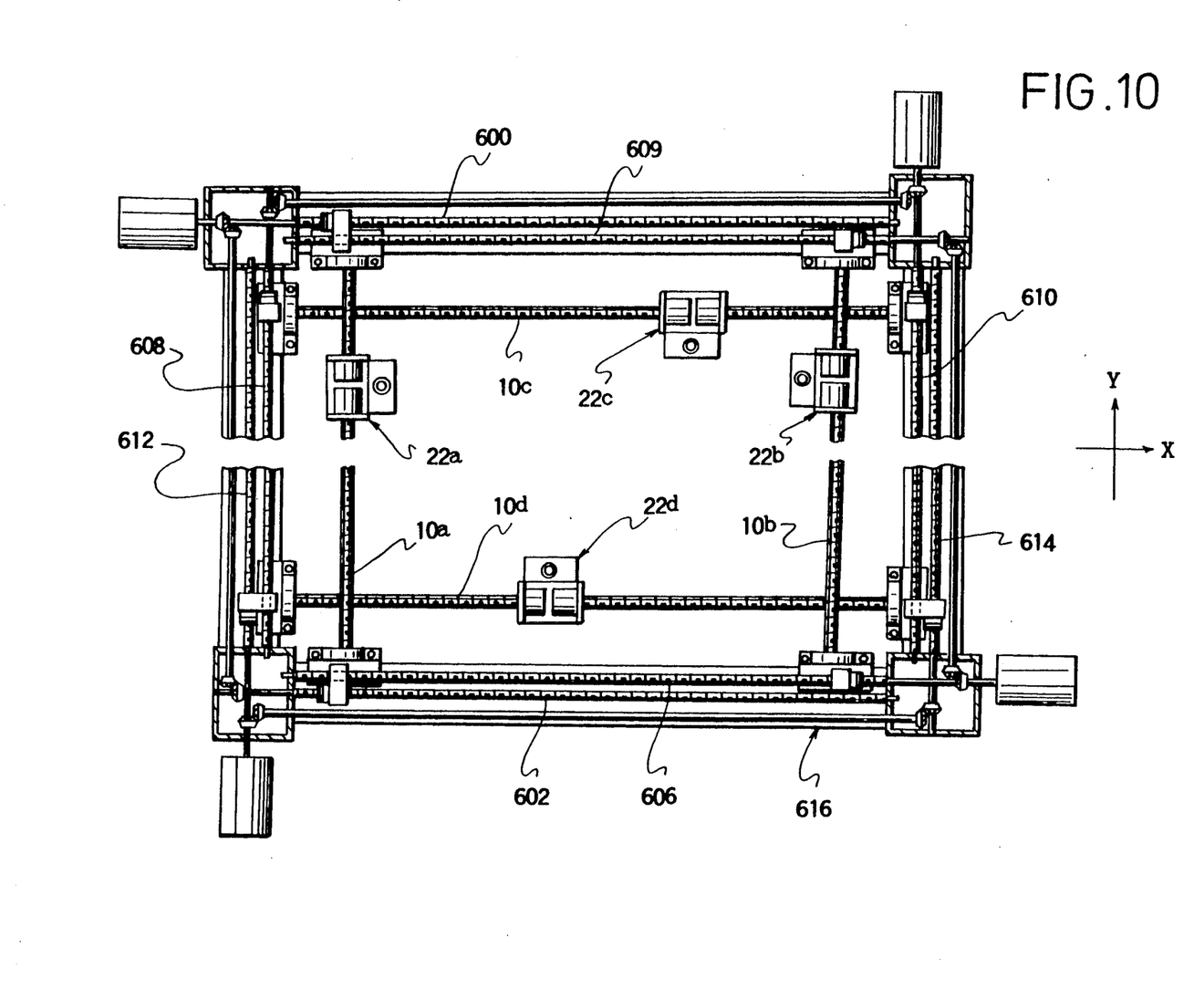
FIG. 10 shows a plan view of a drive system of a seventh embodiment.

Note that, in the seventh embodiment, the main shafts 10a and 10b are arranged in the Y-direction; the main shafts 10c and 10d are arranged in the X-direction (see FIG. 10). In this embodiment, all main shafts 10 are arranged in the Y-direction but the function of this embodiment is similar to the seventh embodiment.

NINETH EMBODIMENT

Figure 12:
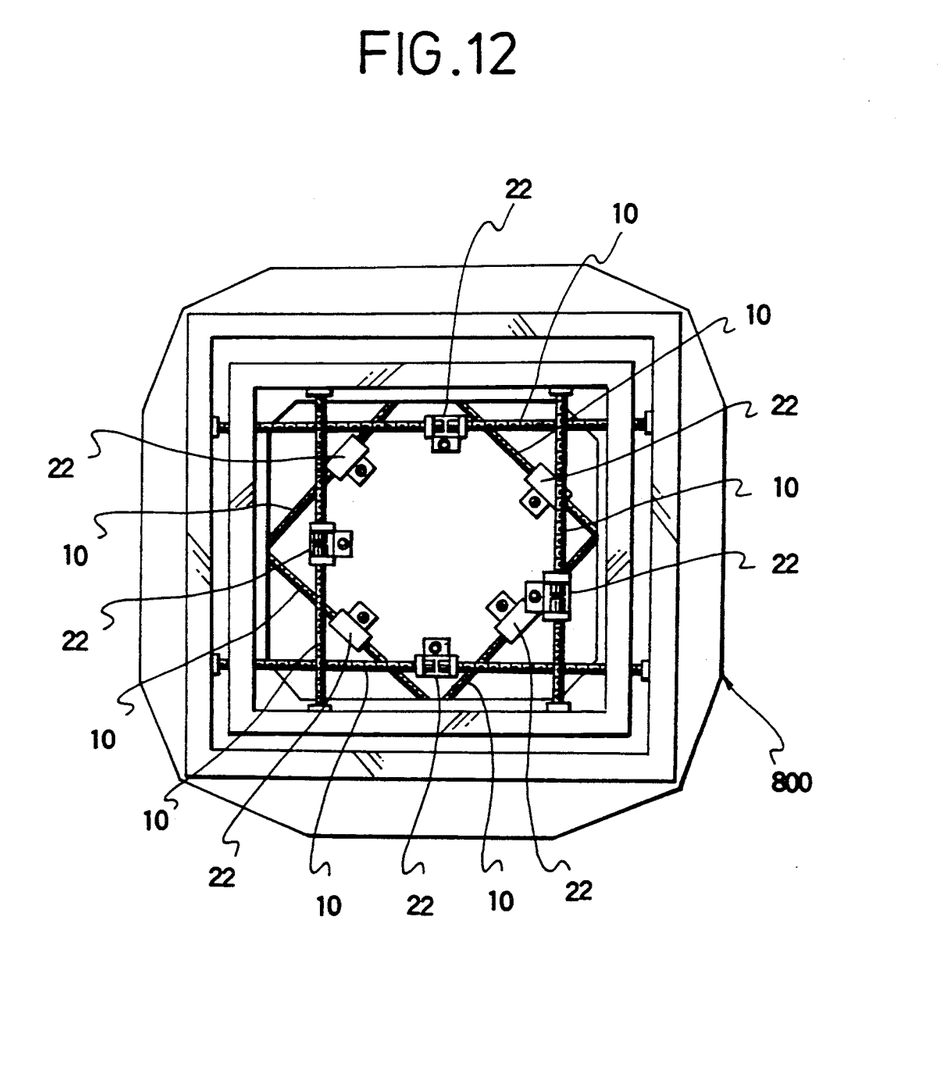
FIG. 12 shows a plan view of a drive system of a ninth embodiment.

The ninth embodiment will be explained with reference to FIG. 12.

There are set a couple of subdrive systems on the upper side of a base 800 and there are another couple of subdrive systems on the lower side of the base 800. Each subdrive system is the drive system of the third embodiment. The subdrive systems on the upper side are mutually separated away in the vertical direction. And the subdrive systems on the lower side are also mutually separated away in the vertical direction.

Eight rotatable sliders 22 can be moved independently.

One couple of subdrive systems, which are on the upper side, are rotated 45 degrees with respect to the other couple of subdrive systems, which are on the lower side.

Three or more subdrive systems can be set on the upper and/or the lower side of the base 800 with considering number of subdrive systems, separation therebetween, sizes thereof, etc. Further, other drive systems of former embodiments can be adopted as a subdrive system of this embodiment.

Preferred embodiments of the present invention have been described but the present invention is not limited to above described embodiments. Many modificationis can be allowed without deviating the spirit of the invention.

What is claimed is:

1. A drive system comprising:
    a main shaft having a spiral screw groove formed on an outer circumferential face thereof and a linear spline groove formed thereon in an axial direction to cross the screw groove, both ends of the main shaft are fixed to be nonrotatable;
    a rotatable moving body having a rotatable screw-rotor covering the main shaft and screwing the screw groove thereon and a rotatable spline-rotor covering the main shaft and engaging with the spline groove thereon; and
    driving means for selectively rotating the screw-rotor and the spline-rotor, the driving means being mounted on the rotatable moving body.

2. The drive system according to claim 1, further comprising an attaching section for attaching tools or work to be machined being provided on the rotatable moving body.

3. A drive system comprising:
    a couple of travellers being movable linearly;
    travelling means for moving the travellers in same direction at same speed;
    a main shaft having a spiral screw groove grooved on the outer circumferential face and a linear spline groove grooved thereon in the axial direction to cross the screw groove, both ends of the main shaft are respectively fixed to the travellers so as not to rotate;
    a rotatable moving body having a rotatable screw-rotor covering the main shaft and screwing the screw groove thereon and a rotatable spline-rotor covering the main shaft and engaging with the spline groove thereon; and
    driving means for selectively rotating the screw-rotor and the spline-rotor.

4. The drive system according to claim 3, further comprising an attaching section for attaching tools, works to be machined, etc. provided to the rotatable moving body.

5. The drive system according to claim 3, wherein the travelling means has a couple of ball bearing screws and a motor mechanism for rotating the ball bearing screws in same direction at same speed, the travellers are respectively screwed on the ball bearing screws.

6. The drive system according to claim 5, wherein the motor mechanism has a motor and transmitting means for transmitting the torque of the motor to the ball bearing screws.

7. The drive system according to claim 3, wherein the travelling means has a couple of endless belts and a motor mechanism for driving the endless belts in same direction at same speed, the travellers are respectively connected to the endless belts.

8. The drive system according to claim 7, wherein the motor mechanism has a motor and transmitting means for transmitting the torque of the motor to the endless belts.

9. A drive system comprising,
    a plurality of sub drive systems, each of the sub drive systems including:
    a couple of travellers being movable linearly;
    travelling means for moving the travellers in same direction at same speed;
    a main shaft having a spiral screw groove grooved on the outer circumferential face and a linear spline groove grooved thereon, both ends of the main shaft are respectively fixed to the travellers so as not to rotate;
    a rotatable moving body having a rotatable screw-rotor covering the main shaft and screwing the screw groove thereon and a rotatable spline-rotor covering the main shaft and engaging with the spline groove thereon; and
    driving means for selectively rotating the screw-rotor and the spline-rotor,
    wherein moving planes, each of which includes positions to which the rotatable moving body moves, of the sub drive systems are mutually arranged in parallel.

10. The drive system according to claim 9, wherein each of the sub drive system further comprises an attaching section for attaching tools, works to be machined, etc. provided to the rotatable moving body.

11. The drive system according to claim 9, wherein the travelling means of each sub drive system has a couple of ball bearing screws and a motor mechanism for rotating the ball bearing screws in same direction at same speed, the travellers are respectively screwed on the ball bearing screws.

12. The drive system according to claim 11, wherein the motor mechanism has a motor and transmitting means for transmitting the torque of the motor to the ball bearing screws.

13. The drive system according to claim 9, wherein the travelling means of each sub drive system has a couple of endless belts and a motor mechanism for driving the endless belts in same direction at same speed, the travellers are respectively connected to the endless belts.

14. The drive system according to claim 13, wherein the motor mechanism has a motor and transmitting means for transmitting the torque of the motor to the endless belts.

15. The drive system according to claim 1, further comprising means for supplying at least one of electricity and compressed air to the rotatable moving body, said means for supplying including a tube extending to the rotatable moving body and containing at least one of cables for electricity and tubes for compressed air, the at least one of cables and tubes being operatively attached to the screw-rotor and the spline-rotor.

16. The drive system according to claim 15, further comprising a free ring on one side of the rotatable moving body, an end of the tube being attached to the free ring, the free ring being movable along the axial direction of the main shaft without being rotated therearound even when the rotatable moving body is rotated around the main shaft.

17. The drive system according to claim 16, further comprising a cylindrical section rigidly mounted on the rotatable moving body, the free ring being rotatable relative to the cylindrical section.

18. The drive system according to claim 17, further comprising an attaching section provided on the rotatable moving body, the means for supplying further supplying at least one of electricity and compressed air to the attaching section.

19. The drive system according to claim 1, wherein the driving means comprises a motor for the screw-rotor and a motor for the spline-rotor, both motors being mounted on the rotatable moving body and being reciprocated and rotated therewith and both motors being operatively connected to the respective screw-rotor and spline-rotor by timing belts.

* * * * *